(12) United States Patent
Dasari et al.

(10) Patent No.: US 8,307,291 B2
(45) Date of Patent: Nov. 6, 2012

(54) WEB PAGE SECURITY SYSTEM AND METHOD

(75) Inventors: Srinivas V Dasari, Scottsdale, AZ (US); Kevin Harvey, Phoenix, AZ (US); Cathy Sockrider, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1203 days.

(21) Appl. No.: 11/161,658

(22) Filed: Aug. 11, 2005

(65) Prior Publication Data

US 2006/0036870 A1    Feb. 16, 2006

Related U.S. Application Data

(60) Provisional application No. 60/600,584, filed on Aug. 11, 2004.

(51) Int. Cl.
*G06F 7/04* (2006.01)

(52) U.S. Cl. .......................................... 715/741; 726/27

(58) Field of Classification Search .......... 715/740–743, 715/783, 760, 762–763, 800, 801, 802, 805, 715/822–824, 748–749, 767, 803, 806, 730–732; 705/50, 51; 726/4, 6, 27–30
See application file for complete search history.

(56) References Cited

U.S. PATENT DOCUMENTS

| | | | |
|---|---|---|---|
| 6,185,614 B1 | 2/2001 | Cuomo et al. | |
| 6,522,738 B1 * | 2/2003 | Cruickshank et al. | ... 379/201.03 |
| 6,688,253 B2 * | 2/2004 | Frink | ............. 116/210 |
| 7,036,081 B2 | 4/2006 | Powlette | |
| 7,131,062 B2 * | 10/2006 | Nguyen et al. | .............. 715/201 |
| 7,552,136 B2 * | 6/2009 | Kelley et al. | ........................ 1/1 |
| 2001/0054155 A1 * | 12/2001 | Hagan et al. | .................. 713/193 |
| 2002/0002569 A1 | 1/2002 | Nguyen et al. | |
| 2002/0022962 A1 * | 2/2002 | Richardson | ....................... 705/1 |
| 2002/0035579 A1 | 3/2002 | Wang et al. | |
| 2002/0097268 A1 | 7/2002 | Dunn et al. | |
| 2003/0056173 A1 | 3/2003 | Copenhaver et al. | |
| 2004/0039819 A1 | 2/2004 | Wyngarden | |
| 2004/0073634 A1 | 4/2004 | Haghpassand | |
| 2004/0139092 A1 * | 7/2004 | Jones et al. | ................... 707/100 |

(Continued)

OTHER PUBLICATIONS

Non-Final Rejection mailed Sep. 30, 2010 in U.S. Appl. No. 12/394,813.

(Continued)

*Primary Examiner* — Steven Sax
(74) *Attorney, Agent, or Firm* — Snell & Wilmer L.L.P.

(57) ABSTRACT

A security application for granting different access rights to web pages and objects on each web page is disclosed. A data table assigns one or more function identifiers (FIDs) to users. A second data table assigns a different object identifier (OID) to each web page, and to assign a different OID for each object on each web page. A third data table assigns an FID to each OID. When a user attempts to access a web page or an object on the web page, a web server compares each of the user's FIDs to the FID assigned to the web page or object. The web server grants access to the web page or object if one of the user's FIDs matches the FID assigned to the web page or object, the user is granted access to the web page or object according to the function of the matched FID.

16 Claims, 6 Drawing Sheets

U.S. PATENT DOCUMENTS

| | | |
|---|---|---|
| 2004/0148341 A1 | 7/2004 | Cotte |
| 2004/0157193 A1 | 8/2004 | Mejias et al. |
| 2004/0177273 A1 | 9/2004 | Ghaffar |
| 2004/0205513 A1 | 10/2004 | Chen et al. |
| 2004/0261010 A1* | 12/2004 | Matsuishi .................. 715/501.1 |
| 2005/0102225 A1* | 5/2005 | Oppenheimer et al. ........ 705/38 |
| 2005/0114236 A1* | 5/2005 | Hammell ........................ 705/28 |
| 2005/0150363 A1* | 7/2005 | Shibukawa et al. ............. 84/653 |
| 2005/0240857 A1* | 10/2005 | Benedict et al. .............. 715/500 |
| 2005/0283408 A1* | 12/2005 | Kassan ........................... 705/26 |
| 2006/0085275 A1* | 4/2006 | Stokes et al. .................... 705/26 |
| 2007/0100967 A1* | 5/2007 | Smith et al. .................. 709/219 |

OTHER PUBLICATIONS

USPTO; Office Action dated Mar. 10, 2011 in U.S. Appl. No. 12/394,813.

USPTO; Advisory Action dated May 31, 2011 in U.S. Appl. No. 12/394,813.

USPTO; Office Action dated Dec. 8, 2011 in U.S. Appl. No. 12/394,813.

Advisory Action dated Aug. 27, 2012 in U.S. Appl. No. 12/394,813.

Final Office Action dated Jun. 28, 2012 in U.S. Appl. No. 12/394,813.

* cited by examiner

WEB PAGE SECURITY SYSTEM AND METHOD

CROSS-REFERENCE TO RELATED APPLICATIONS

This application claims priority to, and the benefit of, U.S. Provisional Application Ser. No. 60/600,584, filed Aug. 11, 2004, which is hereby incorporated by reference in its entirety.

FIELD OF INVENTION

The invention relates to a security application for a computer, and more particularly, to a multi-tiered security application for a computer.

BACKGROUND OF INVENTION

Web pages typically display one or more objects (e.g., buttons, fields, screens, and the like) and an entity operating a web page often wishes to block access to the entire web page or portions of the web page (e.g., the objects). More particularly, the entity operating the web page may wish to block display of an object included on the web page, block the ability to input data, block the ability to use an object on the web page, and/or block the ability to edit/modify an object on the web page to some users.

Current security systems (e.g., Resource Access Control Facility (RACF)) map a single sign on (SSO) security identifier to, for example, a single Information Management System (IMS) identifier for an entire application. The IMS identifier is used for every transaction and grants the user access to each web page. Furthermore, current security systems are configured such that when the user gains access to the web page, the user has access to the entire web page and each object included on the web page. Therefore, a security application that is capable of providing different levels of access to a plurality of web pages, to different portions of a single web page, and to different objects included on a single web page is needed in the art.

SUMMARY OF INVENTION

A computer-implemented method to control access to a plurality of web pages and to control access to an object included on each of the web pages according to various exemplary embodiments of the invention includes the steps of assigning, in a first data table, at least one function identifier (FID) of a plurality of FIDs to a plurality of users; assigning, in a second data table, a first object identifier (OID) to a first web page; assigning, in the second data table, a second OID to a first object on the first web page; assigning, in a third data table, a first FID of the plurality of FIDs to the first OID; assigning, in the third data table, a second FID of the plurality of FIDs to the second FID; granting access, by a server, to the first web page when at least one FID of a user matches the first FID; and granting access, by the server, to the first object when at least one FID of the user matches the second FID, the plurality of FIDs comprising, for example, a display FID, an input FID, and an edit FID. In one embodiment, when the first FID and second FID are different FIDs, and step of assigning at least one user FID includes the steps of assigning, in the first data table, a first user FID to the user, and assigning, in the first data table, a second user FID to the user, wherein the first user FID and the second user FID are different FIDs. When the first user FID is display FID and the first FID is display FID, granting access to the first web page includes granting display access to the first web page. When the second user FID is input FID and the second FID is input FID, granting access to the first object includes granting input access to the first object. Furthermore, when the second user FID is edit FID and the second FID is edit FID, granting access to the first object includes granting edit access to the first object.

In accordance with another exemplary embodiment, the method further includes the steps of assigning, in the second data table, a third OID to a second web page; assigning, in the third data table, a third FID to the third OID; and granting access, by the server, to the second web page when one of the first FID and the second FID match the third FID. Furthermore, the method includes the steps of assigning, in the second data table, a fourth OID to a second object on the second web page; assigning, in the third data table, a fourth FID to the fourth OID; and granting access, by the server, to the second object when one of the first user FID and the second user FID match the fourth FID.

A computer including a multi-tiered security application according to various exemplary embodiments of the invention includes a server configured to operate a plurality of web pages, the plurality of web pages each comprising an object; a first data table configured to assign at least one FID to a plurality of users; a second data table configured to assign an OID to each web page and to assign an OID to each object; and a third data table configured to assign an FID to each OID, each FID comprising a function level. In one embodiment, the server is configured to compare a user FID to a first FID assigned to a first OID assigned to a web page when a user attempts to access the web page, grant function access corresponding to the matched FID, to the user, to the web page when the user FID matches the FID assigned to the OID assigned to the web page, compare a user FID to a second FID assigned to a second OID assigned to an object when a user attempts to access the object, and grant function access corresponding to the matched FID, to the user, to the object when the user FID matches the FID assigned to the OID assigned to the object. In addition, the server is further configured to enable the user to view the web page when the user FID is the display FID and the first FID are both a display FID, enable the user to input information into the web page when the user FID and the first FID are both an input FID, and enable the user to edit the web page when the user FID and the first FID are both an edit FID. Furthermore, the server is configured to enable the user to view the object when the user FID is the display FID and the first FID are both a display FID, enable the user to input information into the object when the user FID and the first FID are both an input FID, and enable the user to edit the object when the user FID and the first FID are both an edit FID.

BRIEF DESCRIPTION OF THE DRAWINGS

A more complete understanding of the present invention may be derived by referring to the detailed description and claims when considered in connection with the drawing Figures, where like reference numbers refer to similar elements throughout the Figures, and:

DETAILED DESCRIPTION

Figure 1:
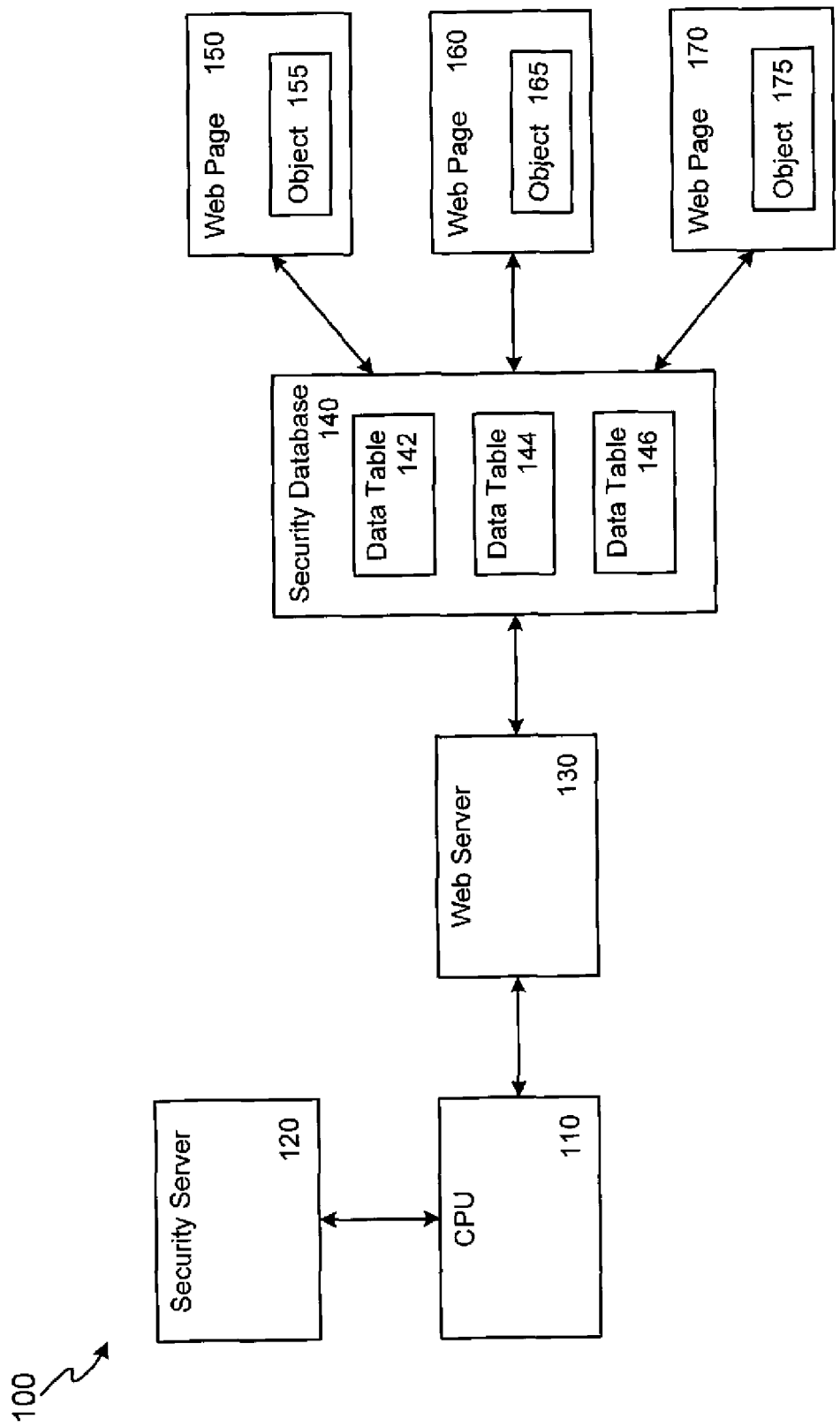
FIG. 1 is a block diagram of a computer including a multi-tiered security application in accordance with one embodiment of the present invention.

The detailed description of exemplary embodiments of the invention herein makes reference to the accompanying drawings and screenshots, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties.

For the sake of brevity, conventional data networking, application development and other functional embodiments of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Various embodiments of the present invention are directed to a security application and method for selectively granting access to a user to one or more web pages and one or more objects included on each web page according to the user's function level. Each web page is assigned a function level, which is also assigned to a user, to access the web site. In addition, each object on each web page is also assigned its own individual function level, which is separate from the function level required to access the web page on which it resides. In various exemplary embodiments, a user is assigned one or more function levels and the user is able to access (or access and perform various functions on various web pages, and objects on each web page) according to the user's function level in relation to the function level for each web page and each object on each web page. For example, a user assigned only a display function level is not able to access a web page requiring an input or edit function level. Furthermore, the user may be able to access a web page with a display function level, but objects on the web page having an input or edit function level would not be displayed (i.e., blocked) to the user. Alternatively, the objects are viewable by the user, but the user is unable to perform pre-defined functions to the objects.

Notably, embodiments of the present invention are capable of providing real-time changes to security within the application without the need for changing the programs/code operating the web pages and the programs/code operating any objects included on the web pages. In addition, embodiments of the present invention are capable of being utilized and/or implemented in conjunction with existing security systems (e.g., Resource Access Control Facility (RACF) systems).

FIG. 1 is a block diagram of an exemplary embodiment of a computer 100 including a multi-tiered security application. As those skilled in the art will appreciate, computer 100 typically includes an operating system (e.g., Windows NT, 95/98/2000, Linux, Solaris, etc.) as well as various conventional support software and drivers typically associated with computers. Computer 100 may be in a home or business environment with access to a network. In various exemplary embodiments, computer 100 is accessed through the Internet via a commercially-available web-browser software package or through an intranet connection. Access to the Internet or intranet may be accomplished through any suitable communication means, such as, for example, a telephone network, point of interaction device (e.g., personal digital assistant, cellular phone, kiosk, and the like), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Computer 100, in one exemplary embodiment, includes one or more central processing units (CPUs) 110, wherein CPU 110 may be any hardware and/or software suitably configured to read and execute computer programs and/or software instructions. As such, CPU 110 may include any processor for processing digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including, for example, client data, merchant data, financial institution data, and/or other suitable data capable of being used in association with the present invention.

Computer 100 also includes one or more security servers 120 connected to CPU 110, wherein security server 120 includes any hardware and/or software suitably configured to receive authentication credentials, encrypt and decrypt credentials, authenticate credentials, and grant access rights according to a user's pre-determined privileges attached to the credentials.

Computer 100 also includes one or more web servers 130 connected to CPU 110, wherein web server 130 includes any hardware and/or software suitably configured to store and operate one or more web pages (e.g., web pages 150, 160, and/or 170) or other Internet/intranet-based graphical user interface (GUI) accessible by users. In accordance with various exemplary embodiments, web pages 150, 160, and/or 170 include any information and are appropriately configured to suit the needs of the entity operating computer 100. Notably, the term "web page" as it is used herein is not meant to limit the type of documents and applications that might be used to interact with the user. For example, a typical website may include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

Furthermore, web pages 150, 160, and 170 each include one or more objects (e.g., objects 155, 165, and 175, respectively) on them. The term "object" as used herein includes any object, GUI, and the like known in the art or later developed. Examples of suitable objects include, but are not limited to, text fields, text displays, links, portals, modules, screen buttons, radio buttons, and the like.

Computer 100 also includes one or more security databases 140 associated with web pages 150, 160, and 170. Security database 140 includes any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Security database 140 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

In accordance with one exemplary embodiment, security database 140 includes a plurality of data tables (e.g., data table 142, data table 144, and data table 146) for storing various identifiers (e.g., function identifiers (FIDs) and object identifiers (OIDs)) assigned to users; web pages 150, 160, and 170; and objects 155, 165, 175. The FIDs are used to gain function access to web pages, objects on the web pages, databases, and/or the like. The FIDs, in one exemplary embodiment, include a display FID, an input FID, and an edit FID, each of which corresponds to a functional capability and/or a function level granted to a user. For example, a display FID allows a user to view web pages and objects that have a display FID assigned to them. Likewise, a user would be required to have an input FID or an edit FID to have input access or edit access to web pages and/or objects having an input FID or edit FID assigned to them, respectively. Although the current discussion references a display FID, an input FID, and an edit FID, the present invention is not limited to such, and notably, the invention contemplates that additional FIDs having a variety of corresponding functions may be implemented. For example, additional FIDs may include, but are not limited to, a CASE FID for reviewing merchant cases and disputes, a characteristic (CHAR) FID for inquiring about merchant overall characteristics and data), a duplicate override (DUP OVD) FID for overriding duplicate merchant functions, an electronic data capture update (EDC UPDT) FID for updating merchant electronic data capture characteristics, a financial details (FIN DET) FID for submitting merchant financial details, a hierarchy (HIER) FID for entering a merchant's hierachy regarding chain locations, an inquiry FID for any kind of merchant inquiry, inquiry banking FID for inquiring into merchant banking information, inquiry pending and paid (INQUIRY PND-PD) FID for inquiring into merchants' pending and paid transactions, set up FID for setting up new merchants, supplies FID for ordering/viewing merchant supplies, update memo (UPDT MEMO) FID for adding/updating merchant memorandums, a special memorandum update (UPDT MEMO999) FID for updating merchant memorandums where the memorandum does not expire, and/or any other FID will a function suitable to the needs of the entity operating the plurality of web pages and objects.

A different OID is assigned to each of web pages 150, 160, and 170; and each of objects 155, 165, and 175. The OIDs enable security/function changes to be made to computer 100 without any of the programs/codes operating web pages 150, 160, and 170; and operating each of objects 155, 165, and 175 needing to be changed.

Data table 142 is configured to store and assign one or more FIDs to each user according to a function level associated with that particular user. Data table 144 is configured to store and assign a different OID for each of web pages 150, 160, and 170, and store and assign a different OID for each of objects 155, 165, and 175. Data table 146 is configured to store and assign one or more FIDs to each OID, the FIDs corresponding to pre-determined functions available for users to perform on the web page or object assigned to each particular OID.

In one embodiment, an Internet Information Server, Microsoft Transaction Server, and Microsoft SQL Server, are used in conjunction with a Microsoft operating system, Microsoft NT web server software, a Microsoft SQL database system, and a Microsoft Commerce Server. In another embodiment, the invention is implemented utilizing Web Sphere Application Server, IBM MQ series, IMS transaction server, and DB2 in with conjunction Z/OS operating system. Additionally, components such as Access or SQL Server, Oracle, Sybase, Informix MySQL, Intervase, etc., may be used to provide an ADO-compliant database management system. The present invention is described herein in terms of functional block components, screenshots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows XP, Windows 2000, Windows 98, Windows 95, MacOS, OS/2, BeOS, Linux, UNIX, Solaris, Z/OS, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. The system may also reside within a local area network (LAN) which interfaces to network via a leased line (T1, D3, etc.). Such communication methods are well known in the art, and are covered in a variety of standard texts. See, e.g., Gilbert Held, "Understanding Data Communications" (1996), hereby incorporated by reference.

Figure 2:
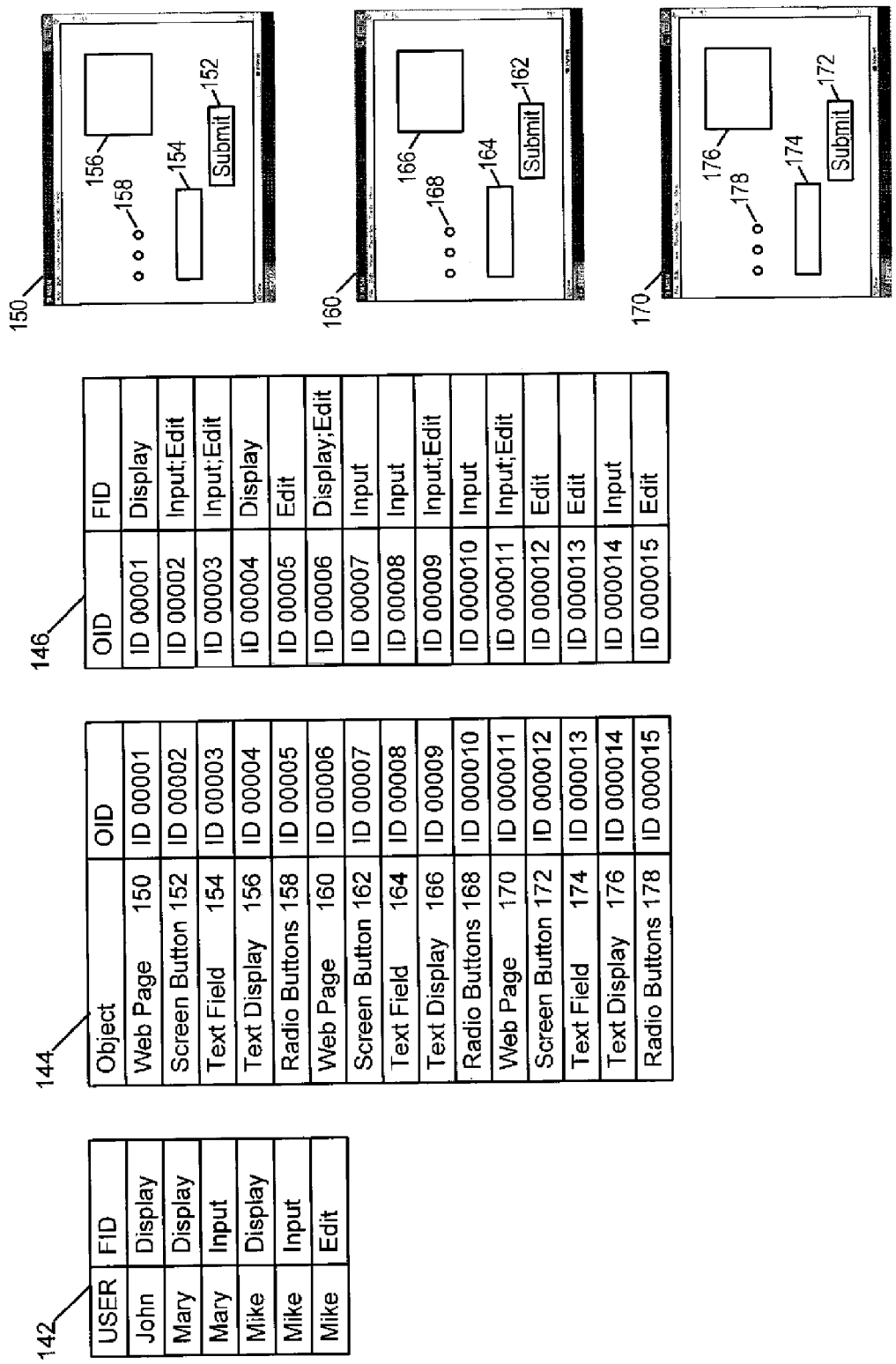
FIG. 2 is a block diagram of data tables and web pages included in the computer of FIG. 1 in accordance with one embodiment of the present invention.

FIG. 2 is a block diagram of one exemplary embodiment of data tables 142, 144, and 146; and web pages 150, 160, and 170. In data table 142, for example, John only has a display FID assigned to him. Thus, John is only able to view web pages and objects that have display FID assigned to them. Mary has both display FID and input FID assigned to her. Thus, Mary is able to view web pages and objects that have display FID assigned to them, and Mary is able to input data into web pages and objects that have input FID assigned to them. Furthermore, Mike has display FID, input FID, and edit FID assigned to him. Thus, Mike is able to view web pages and objects that have display FID assigned to them, input data into web pages and objects that have input FID assigned to them, and edit web pages and objects that have edit FID assigned to them.

In data table 144, web page 150 is assigned ID 00001, screen button 152 assigned ID 00002, text field 154 is assigned ID 00003, text display 156 is assigned ID 00004, radio buttons 158 are assigned ID 00005, web page 160 is assigned ID 00006, screen button 162 assigned ID 00007, text field 164 is assigned ID 00008, text display 166 is assigned ID 00009, radio buttons 168 are assigned ID 00010, web page 170 is assigned ID 00011, screen button 172 assigned ID 00012, text field 174 is assigned ID 00013, text display 176 is assigned ID 00014, and radio buttons 178 are assigned ID 00015. Furthermore, in data table 146, ID 00001 is assigned display FID, ID 00002 is assigned input FID and edit FID, ID 00003 is assigned input FID and edit FID, ID 00004 is assigned display FID, ID 00005 is assigned edit FID, 00006 ID is assigned display FID and edit FID, 00007 ID is assigned input FID, 00008 ID is assigned input FID, 00009 ID is assigned input FID and edit FID, 00010 ID is assigned input FID, 00011 ID is assigned input FID and edit FID, 00012 ID is assigned edit FID, 00013 ID is assigned edit FID, 00014 is assigned input FID, and ID 00015 is assigned edit FID.

Figure 3:
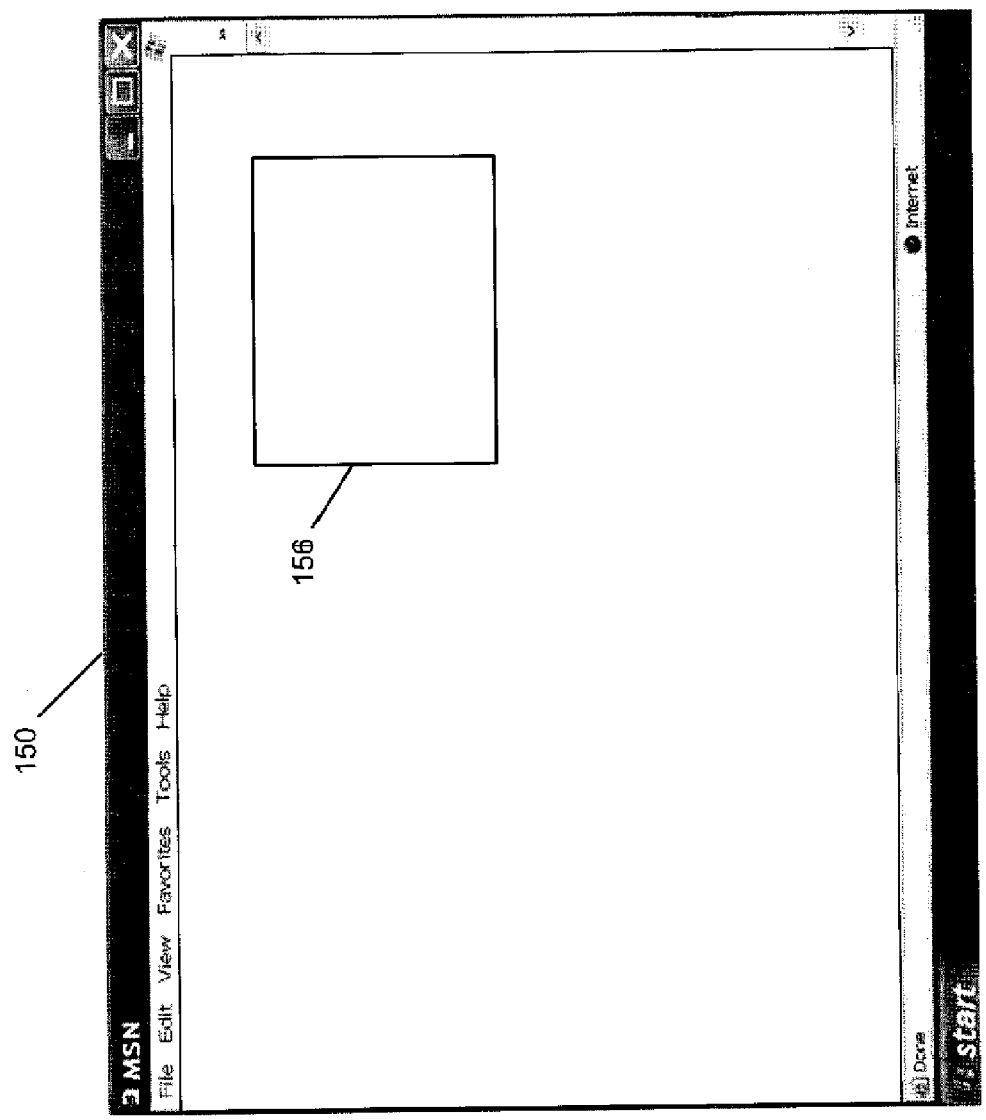
FIG. 3 is a screenshot of display FID access to one web page included in FIG. 2 in accordance with one embodiment of the present invention.

FIG. 3 is a screenshot of an example of how web page 150 would appear to John, in accordance with one embodiment of the invention. In this example, John is granted display access web page 150 since both John and web page 150 have display FID assigned to them. Furthermore, John is granted display access to text display 156 since both John and text display 156 have display FID assigned to them. Therefore, because display access enables a user to perform the function of viewing web pages and objects, John is able to view web page 150 and text display 156. John (or any other user) is not granted any other type of function access (e.g., input and edit) to web page 150 and text display 156 because these items do not have any other FID assigned to them. To enable ID 00001 and/or ID 00004 to have additional functions performed on them, each would have to have additional FIDs assigned to them in data table 146 (which John would still not have access to since he only has display FID assigned to him). Furthermore, John does not have access to screen button 152, text field 154, and radio buttons 158 because these objects do not have display FID assigned to them, and John does not have the FID required to access the other available functions. Thus, John is unable to perform any functions on screen button 152, text field 154, and radio buttons 158. Notably, in the embodiment illustrated in FIG. 3, John is blocked from viewing screen button 152, text field 154, and radio buttons 158. In other embodiments, screen button 152, text field 154, and radio buttons 158 may be "shaded" out to prevent John from performing any functions with them, but John may still be able to view them.

Figure 4:
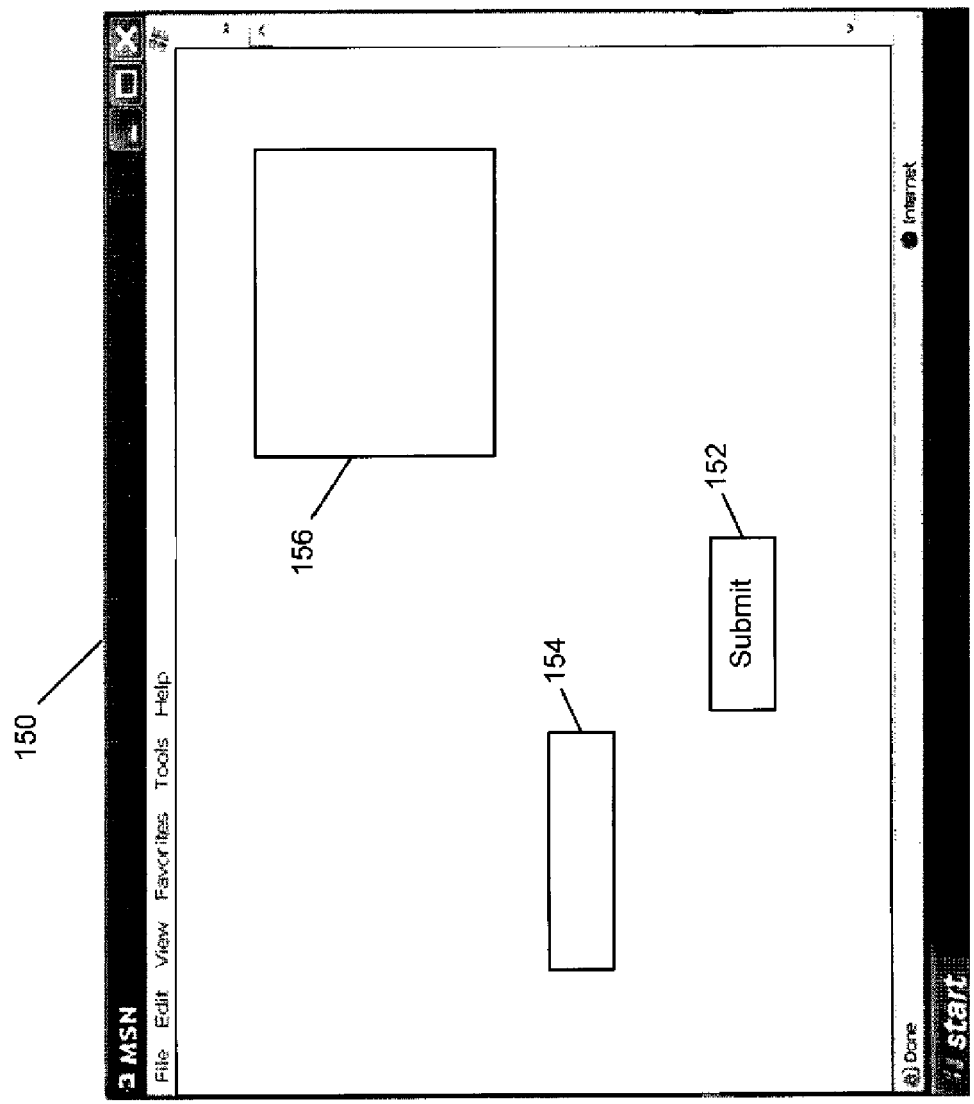
FIG. 4 is screenshot of display FID and input FID access one web page included in FIG. 2 in accordance with one embodiment of the present invention.

FIG. 4 is a screenshot of an example of how web page 150 would appear to Mary, in accordance with one embodiment of the invention. In this example, Mary is granted display access web page 150 since both Mary and web page 150 have display FID assigned to them, and Mary is granted display access to text display 156 since they both have display FID assigned to them. Thus, Mary is able to view web page 150 and text display 156. Notably, because web page 150 and text display 156 do not have any other FIDs assigned to them, Mary is unable to perform any other functions to these items even though Mary also has input FID assigned to her. Furthermore, Mary is granted input access to screen button 152 and text field 154 because Mary and screen button 152 both have input FID assigned to them, and Mary and text field 154 both have input FID assigned to them. Thus, because input FID grants a user the ability to input data into a web page or object assigned input FID, Mary is able to input data into text field 154 and submit that data via screen button 152. Notably, Mary is not granted edit access to text field 154 and radio buttons 158 because Mary does not have the required edit FID assigned to her to access these items. Thus, Mary is blocked from performing edit functions on text field 154, and blocked from performing any function on radio buttons 158. In the embodiment illustrated in FIG. 4, Mary is blocked from even viewing radio buttons 158. In other embodiments, radio buttons 158 may be "shaded" out to prevent Mary from performing functions to radio buttons 158, but Mary may still be able to view them.

Figure 5:
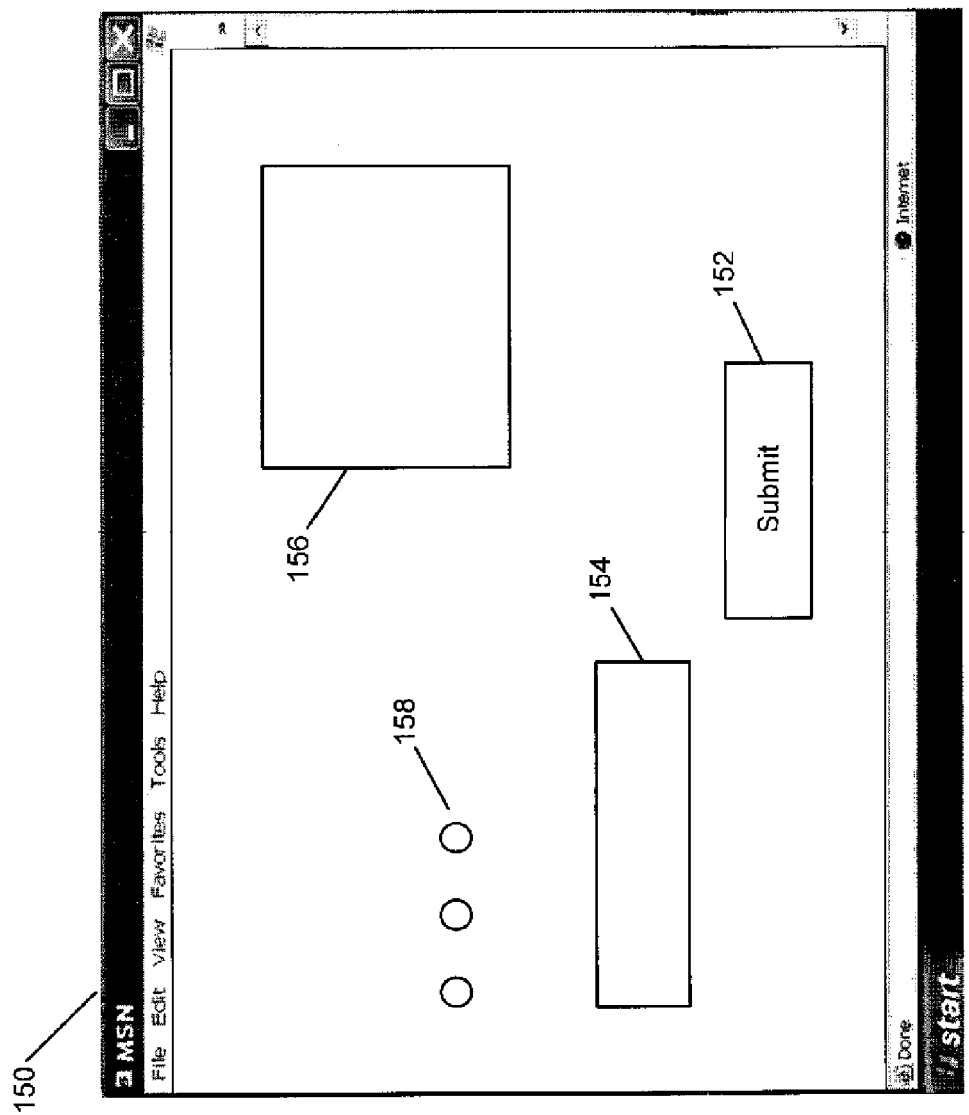
FIG. 5 is screenshot of display FID, input FID, and edit FID accessing one web page included in FIG. 2 in accordance with one embodiment of the present invention.

FIG. 5 is a screenshot of an example of how web page 150 would appear to Mike, in accordance with one embodiment of the invention. In this example, Mike is granted the same function access to web page 150, text display 156, screen button 152, and text field 154 as Mary because, like Mary, Mike has both display FID and input FID assigned to him. In addition, Mike has edit access to text field 154 and radio buttons 158 because he has the required edit FID assigned to him. Thus, since edit FID allows a user to edit the content of a web page or object assigned edit FID, Mike is able to edit the contents of text field 154 and radio buttons 158, and submit those edits via screen button 152. Notably, access to web pages 160 and 170 and each of their respective objects would be analyzed in a manner similar to the above discussion.

Figure 6:
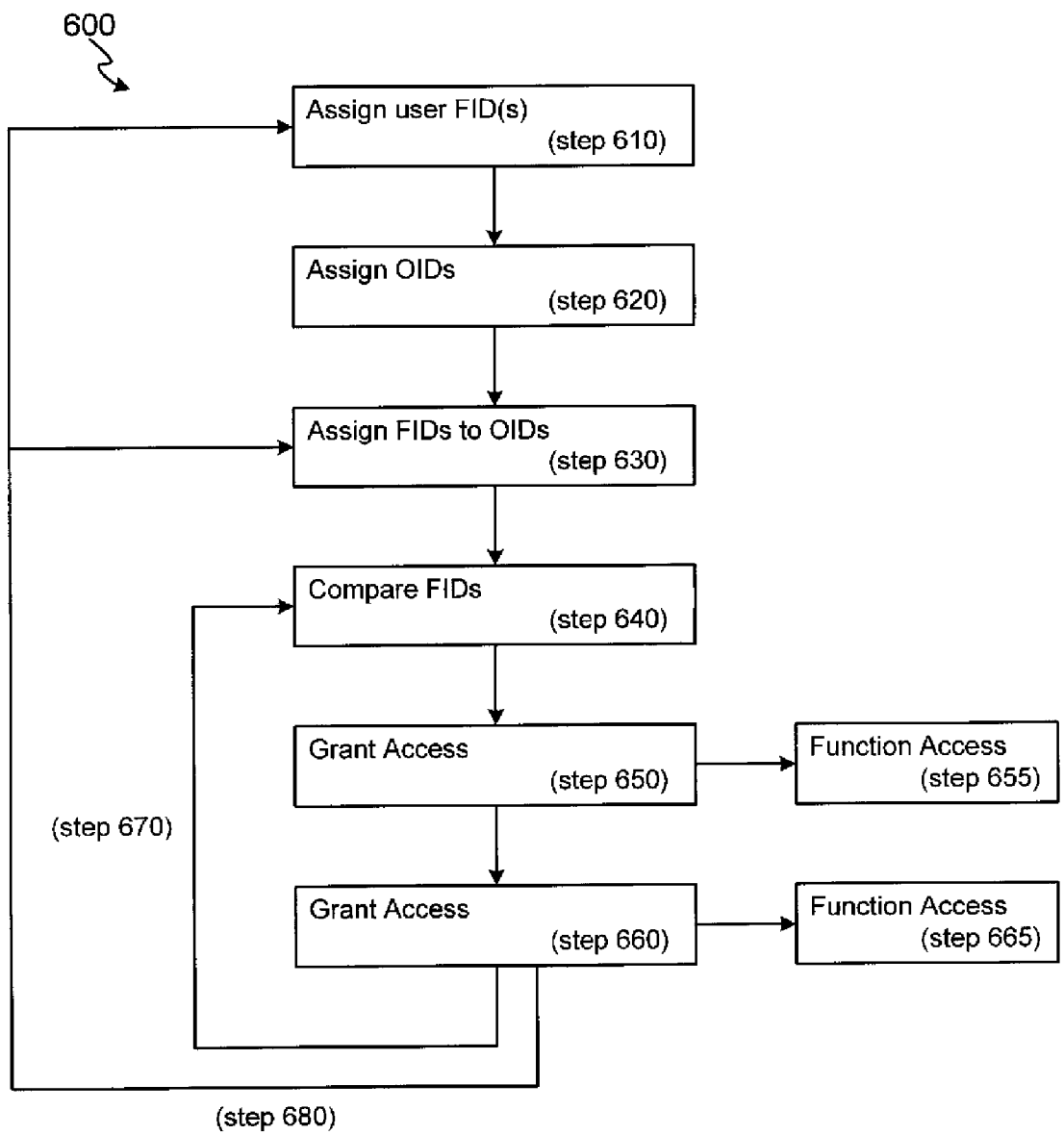
FIG. 6 is a flow diagram of a method to control access to one or more web pages and one or more objects included on each of the web pages, in accordance with one embodiment of the present invention.

FIG. 6 is a flow diagram of an exemplary embodiment of a method 600 to control access to one or more web pages (e.g., web pages 150, 160, and/or 170) and one or more objects (e.g., objects 155, 165, and/or 175) included on the web pages. In accordance with one exemplary embodiment, method 600 initiates by storing and assigning, in a data table (e.g., data table 142) of a security database (e.g., security database 140), one or more FIDs (e.g., display FID, input FID, and edit FID) to one or more users (step 610). Method 600 also includes the steps of storing and assigning, in a second data table (e.g., data table 144), an OID to each web page (e.g., web pages 150, 160, and 170) and each object (e.g., objects 155, 165, and 175) on the web pages (step 620). Furthermore, method 600 includes storing and assigning an FID to each OID assigned in step 620 (step 630).

Furthermore, a web server (e.g., web server 130) is programmed to compare the FID(s) assigned to the user to the FID assigned to web page 150 and object 155 when a user attempts to access web page 150 (step 640). Web server 130 grants access to web page 150 to the user if the FID assigned to the user substantially matches the FID assigned to web page 150 (step 650). The access granted to web page 150 corresponds to the function of the mutually assigned FID (step 655). For example, a substantially matched display FID grants the user the ability to view the web page, a matched input FID grants the user the ability to input data into the web page, and a matched edit FID allows the user to edit the web page.

Web sever 130 grants access to object 155 if the FID assigned to the user substantially matches the FID assigned to object 155 (step 660). The access granted to object 155 corresponds to the function of the mutually assigned FID (step 665). For example, a substantially matched display FID grants the user the ability to view the object, a matched input FID grants the user the ability to input data into the object, and a matched edit FID allows the user to edit the object. Notably, as used herein the term "substantially matches" includes identical, algorithmic, matching within a margin of error, matching within a range of values, and the like.

Method 600 also includes repeating steps 640 through 665 for one or more additional web pages (e.g., web page 160 and/or 170) and each object (e.g., objects 165 and/or 175) on each of web page 160 and/or 170 (step 670). Furthermore, method 600 includes changing one or more FIDs of a user or an OID (step 680). In accordance with one embodiment of the invention, a change to the FID of a web page or object is made without having to change the program and/or code operating the web page or object because all that is needed is a change to the FID assigned to the appropriate OID in data table 146. Furthermore, by changing an FID, adding an FID to, or subtracting an FID from, a user in data table 142, the function access of a user to web pages and/or objects can likewise be changed. By doing so, a user may be able to perform different functions, more functions, or less functions to a web page or object than prior to the change.

In accordance with one exemplary embodiment, web server 130 denies access to the user by omitting display of any web pages and/or objects that include an FID that does not match any FID(s) assigned to the user. In another embodiment, web server 130 denies access to the user by shading objects with an FID that does not match any FID(s) assigned to the user.

As discussed above, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Furthermore, the present invention is described herein with reference to screenshots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims.

What is claimed is:

1. A computer-implemented method comprising:
assigning, by a computer-based system for access control, a first user function identifier (FID) to a first user;
assigning, by the computer-based system, a second user FID to a second user;
assigning, by the computer-based system, a first object identifier (OID) to a first web page;
assigning, by the computer-based system, a second OID to a first object on said first web page, wherein said second OID is one of a plurality of OIDs on said first web page, wherein a first subset of said plurality of OIDs is associated with a first FID in a plurality of FIDs, and wherein a second subset of said plurality of OIDs is associated with a second FID in said plurality of FIDs;
assigning, by the computer-based system, said first FID to said first OID;
assigning, by the computer-based system, said second FID to said second OID;
assigning, by the computer-based system, a third FID to a third OID associated with a second object on said first web page, wherein, based on said first user FID, said first user has a different permission level for said first object than said second object;
comparing, by the computer-based system, said first user FID, said second user FID, said first FID and said second FID, wherein said first user FID, said second user FID, said first FID, and said second FID are each part of said plurality of FIDs, wherein a first subset of said plurality of FIDs is associated with a display FID, wherein a second subset of said plurality of FIDs is associated with an execution FID, wherein a third subset of said plurality of FIDs is associated with a first edit FID, and wherein a fourth subset of said plurality of FIDs is associated with a second edit FID, wherein said first edit FID and said second edit FID comprise different edit permission levels, and wherein a plurality of FIDs in the third subset and a plurality of FIDs in the fourth subset do not overlap; and
in response to said first user FID substantially matching said first FID:
enabling, by the computer-based system, display to said first user of said first object on said first web page in response to said first FID being said display FID, and
prohibiting, by the computer-based system and in response to said first user FID not substantially matching said second FID, execution of a function associated with said first object in response to said second FID being said execution FID,
wherein, based on said first user FID and said second user FID, said second user has a different permission level for said first object than said first user.

2. The method of claim 1, further comprising assigning, by the computer-based system, a third user FID to said first user, wherein said first user FID and said third user FID are different FIDs and said third user FID is part of said plurality of FIDs, wherein said first FID and said second FID are different FIDs.

3. The method of claim 2, further comprising, in response to said second user FID substantially matching said second FID, enabling, by the computer-based system, execution a function associated with said first object, wherein said second user FID is said execution FID and said second FID is said execution FID.

4. The method of claim 2, further comprising:
assigning, by the computer-based system, a fourth OID to a second web page;
assigning, by the computer-based system, a fourth FID to said fourth OID, wherein said fourth FID is part of said plurality of FIDs; comparing, by the computer-based system, said first user FID and said second user FID to said fourth FID, and in response to at least one of said first user FID or said second user FID substantially matching said fourth FID enabling, by the computer-based system, display of said second web page to said first user in response to said fourth FID being said display FID and at least one of said first user FID or said second user FID being said display FID.

5. The method of claim 4, further comprising:
assigning, by the computer-based system, a fifth OID to a second object on said second web page;
assigning, by the computer-based system, a fifth FID to said fifth OID, wherein said fifth FID is part of said plurality of FIDs;
comparing, by the computer-based system, said first user FID and said second user FID to said fifth FID, and in response to at least one of said first user FID or said second user FID substantially matching said fifth FID enabling, by the computer-based system, execution of a function associated with said second object in response to said second FID being said execution FID and at least one of said first user FID or said second user FID being said execution FID.

6. The method of claim 1, further comprising, in response to said second user FID substantially matching said second FID, enabling, by the computer-based system, edit access to said second object, wherein said second user FID is said first edit FID and said second FID is said first edit FID.

7. The method of claim 1, further comprising: comparing, by the computer-based system, said second user FID and said second FID, wherein said second user FID is part of said plurality of FIDs;
in response to said second user FID substantially matching said second FID, enabling, by the computer-based system, display to said second user of said first object on said first web page in response to said second FID being said display FID and enabling, by the computer-based system, execution of a function associated with said first object in response to said second FID being said execution FID.

8. The method of claim 1, further comprising changing, by the computer-based system, said first FID to said third FID without changing a program operating said first web page, wherein said first FID and said third FID are different FIDs.

9. The method of claim 1, further comprising assigning, by the computer-based system, said third FID to said first OID without changing a program operating said first web page, wherein said first FID and said third FID are different FIDs.

10. The method of claim 8, further comprising subtracting, by the computer-based system, at least one of said first FID and said third FID from being assigned to said first OID without changing a program operating said first web page.

11. The method of claim 1, further comprising changing, by the computer-based system, said second FID to said third FID without changing a program operating said first object, wherein said second FID and said third FID are different FIDs.

12. The method of claim 1, further comprising assigning, by the computer-based system, said third FID to said second OID without changing a program operating said first object, wherein said second FID and said third FID are different FIDs.

13. The method of claim 11, further comprising subtracting, by the computer-based system, at least one of said second FID and said third FID from being assigned to said second OID without changing a program operating said first web page.

14. The method of claim 1, wherein said assigning said first FID to said first OID comprises the step of assigning said first FID to said first OID; and said assigning said second FID to said second OID comprises the step of assigning said second FID to said second OID.

15. An article of manufacture including a non-transitory, tangible computer readable storage medium having instructions stored thereon that, in response to execution by a computer-based system for access control, cause the computer-based system to perform operations comprising:
   assigning, by the computer-based system, a first user function identifier (FID) to a first user;
   assigning, by the computer-based system, a second user FID to a second user;
   assigning, by the computer-based system, a first object identifier (OID) to a first web page;
   assigning, by the computer-based system, a second OID to a first object on said first web page, wherein the second OID is one of a plurality of OIDs on said first web page, wherein a first subset of said plurality of OIDs is associated with a first FID in a plurality of FIDs, and wherein a second subset of said plurality of OIDs is associated with a second FID in said plurality of FIDs;
   assigning, by the computer-based system, said first FID to said first OID;
   assigning, by the computer-based system, said second FID to said second OID;
   assigning, by the computer-based system, a third FID to a third OID associated with a second object on said first web page, wherein, based on said first user FID, said first user has a different permission level for said first object than said second object;
   comparing, by the computer-based system, said first user FID, said second user FID, said first FID and said second FID, wherein said first user FID, said second user FID, said first FID, and said second FID are each part of said plurality of FIDs, wherein a first subset of said plurality of FIDs is associated with a display FID, wherein a second subset of said plurality of FIDs is associated with an execution FID, wherein a third subset of said plurality of FIDs is associated with a first edit FID, and wherein a fourth subset of said plurality of FIDs is associated with a second edit FID, wherein said first edit FID and said second edit FID comprise different edit permission levels, and wherein a plurality of FIDs in the third subset and a plurality of FIDs in the fourth subset do not overlap; and
   in response to said first user FID substantially matching said first FID:
      enabling, by the computer-based system, display to said first user of said first object on said first web page in response to said first FID being said display FID, and
      prohibiting, by the computer-based system and in response to said first user FID not substantially matching said second FID, execution of a function associated with said first object in response to said second FID being said execution FID,
   wherein, based on said first user FID and said second user FID, said second user has a different permission level for said first object than said first user.

16. A system comprising:
   a processor for identifying authorized officers,
   a tangible, non-transitory memory configured to communicate with the processor,
   the tangible, non-transitory memory having instructions stored thereon that, in response to execution by the processor, cause the processor to perform operations comprising:
      assigning, by said processor, a first user function identifier (FID) to a first user;
      assigning, by said processor, a second user FID to a second user;
      assigning, by said processor, a first object identifier (OID) to a first web page;
      assigning, by said processor, a second OID to a first object on said first web page, wherein the second OID is one of a plurality of OIDs on said first web page, wherein a first subset of said plurality of OIDs is associated with a first FID in a plurality of FIDs, and wherein a second subset of said plurality of OIDs is associated with a second FID in said plurality of FIDs;
      assigning, by said processor, said first FID to said first OID;
      assigning, by said processor, said second FID to said second OID;
      assigning, by said processor, a third FID to a third OID associated with a second object on said first web page, wherein, based on said first user FID, said first user has a different permission level for said first object than said second object;
      comparing, by said processor, said first user FID, said second user FID, said first FID and said second FID, wherein said first user FID, said second user FID, said first FID, and said second FID are each part of said plurality of FIDs, wherein a first subset of said plurality of FIDs is associated with a display FID, wherein a second subset of said plurality of FIDs is associated with an execution FID, wherein a third subset of said plurality of FIDs is associated with a first edit FID, and wherein a fourth subset of said plurality of FIDs is associated with a second edit FID, wherein said first edit FID and said second edit FID comprise different edit permission levels, and wherein a plurality of FIDs in the third subset and a plurality of FIDs in the fourth subset do not overlap; and
      in response to said first user FID substantially matching said first FID:
         enabling, by said processor, display to said first user of said first object on said first web page in response to said first FID being said display FID, and
         prohibiting, by said processor and in response to said first user FID not substantially matching said second FID, execution of a function associated with said first object in response to said second FID being said execution FID,
      wherein, based on said first user FID and said second user FID, said second user has a different permission level for said first object than said first user.

* * * * *